US012597615B2

(12) United States Patent
Wang et al.

(10) Patent No.: US 12,597,615 B2
(45) Date of Patent: Apr. 7, 2026

(54) CURRENT COLLECTOR AND PREPARATION METHOD THEREFOR, SECONDARY BATTERY, BATTERY MODULE, BATTERY PACK, AND POWER CONSUMING DEVICE

(71) Applicant: CONTEMPORARY AMPEREX TECHNOLOGY (HONG KONG) LIMITED, Ningde (CN)

(72) Inventors: Manman Wang, Ningde (CN); Xiaoming Ge, Ningde (CN); Chuying Ouyang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 522 days.

(21) Appl. No.: 18/127,040

(22) Filed: Mar. 28, 2023

(65) Prior Publication Data

US 2023/0261209 A1 Aug. 17, 2023

Related U.S. Application Data

(63) Continuation of application No. PCT/CN2021/134371, filed on Nov. 30, 2021.

(51) Int. Cl.
| | |
|---|---|
| *H01M 4/80* | (2006.01) |
| *H01M 4/04* | (2006.01) |
| *H01M 4/66* | (2006.01) |

(52) U.S. Cl.
CPC ......... *H01M 4/808* (2013.01); *H01M 4/0435* (2013.01); *H01M 4/662* (2013.01); *H01M 4/667* (2013.01)

(58) Field of Classification Search
None
See application file for complete search history.

(56) References Cited

U.S. PATENT DOCUMENTS

| | | | | | |
|---|---|---|---|---|---|
| 6,214,490 | B1 * | 4/2001 | Pate | ................... | H01M 50/538 |
| | | | | | 429/235 |
| 6,485,865 | B1 * | 11/2002 | Sugikawa | ............. | H01M 4/667 |
| | | | | | 429/235 |
| 2012/0308886 | A1 * | 12/2012 | Goto | ..................... | H01M 4/661 |
| | | | | | 429/211 |
| 2012/0315540 | A1 | 12/2012 | Hosoe et al. | | |

FOREIGN PATENT DOCUMENTS

| | | |
|---|---|---|
| CN | 103290247 A | 9/2013 |
| CN | 207504104 U | 6/2018 |
| CN | 110039858 A | 7/2019 |

(Continued)

OTHER PUBLICATIONS

Extended European Search Report issued Dec. 18, 2024 in European Patent Application No. 21954420.2.

(Continued)

*Primary Examiner* — Tracy M Dove
(74) *Attorney, Agent, or Firm* — XSENSUS LLP

(57) ABSTRACT

A current collector may comprise a strength enhancement layer and a current collecting layer, wherein the current collecting layer may be stacked and bonded with the strength enhancement layer, and the current collecting layer may comprise a foam metal portion and a solid metal portion.

18 Claims, 3 Drawing Sheets

(56)     References Cited

FOREIGN PATENT DOCUMENTS

| CN | 112216875 | A | * | 1/2021 | ............. | H01M 4/80 |
|----|-----------|---|---|--------|--------------|-----------|
| CN | 112635772 | A |   | 4/2021 | | |
| CN | 113169316 | A |   | 7/2021 | | |
| CN | 214313261 | U |   | 9/2021 | | |
| JP | 5-174868  | A |   | 7/1993 | | |
| JP | 2003073875 | A | * | 3/2003 | | |

OTHER PUBLICATIONS

International Search Report mailed on Aug. 10, 2022, received for PCT Application PCT/CN2021/134371, filed on Nov. 30, 2021, 19 pages including English Translation.

* cited by examiner

CURRENT COLLECTOR AND PREPARATION METHOD THEREFOR, SECONDARY BATTERY, BATTERY MODULE, BATTERY PACK, AND POWER CONSUMING DEVICE

CROSS-REFERENCE TO RELATED APPLICATION

The present application is a continuation of International Application No. PCT/CN2021/134371, filed Nov. 30, 2021, which is incorporated herein by reference in its entirety.

TECHNICAL FIELD

The present application relates to the technical field of batteries, and in particular to a current collector and a preparation method therefor, a secondary battery, a battery module, a battery pack, and a power consuming device.

BACKGROUND ART

With the growing demand for energy and increasing awareness of environmental protection, new-type energy sources are getting more and more attention.

Secondary battery is a common new-type energy source, and current collector is an important constituent part of the secondary battery. The current collector not only functions to carry an active material, but also collects and guides electrons generated by an electrochemical reaction to an external circuit, so as to achieve a process of converting chemical energy into electrical energy. A current collector made of a foam metal material has poor mechanical properties, resulting in the problem that the current collector using a foam metal material is likely to be damaged by pressing during winding into a roll.

SUMMARY OF THE DISCLOSURE

The present application provides a current collector and a preparation method therefor, a secondary battery, a battery module, a battery pack, and a power consuming device, so as to solve the problem that a current collector made of a foam metal material in the prior art is likely to be damaged by pressing during winding into a roll.

According to an aspect of the present application, a current collector is provided. The current collector comprises a strength enhancement layer and a current collecting layer which are stacked and bonded, the current collecting layer comprising a foam metal portion and a solid metal portion. The solid metal portion can have a supporting function, which is conducive to preventing affection to a battery due to the foam metal portion being damaged by pressing when the current collector is wound into a roll.

In some embodiments, the solid metal portion extends in a length direction of the current collecting layer such that the solid metal portion can have a supporting function at various positions in the length direction of the current collecting layer so as to prevent the foam metal portion at the various positions of the current collecting layer from being damaged by pressing.

In some embodiments, the current collecting layer comprises a plurality of solid metal portions, with a foam metal portion being provided between two adjacent solid metal portions. The solid metal portions located on two sides of the foam metal portion can function to protect the foam metal portion so as to prevent the foam metal portion located between the two solid metal portions from being damaged by pressing.

In some embodiments, the solid metal portion is provided at one or both ends of the strength enhancement layer in a width direction. The solid metal portion located at the end of the strength enhancement layer can function to protect the foam metal portion located on an inner side thereof against damage by pressing. Further, the solid metal portion at the end in the width direction of the strength enhancement layer is also used to form a tab. The tab formed by the solid metal portion has the characteristics of high structural strength and good welding performance.

In some embodiments, the strength enhancement layer is a sheet-like metal layer, which improves the poor mechanical properties of the current collector and is conducive to solving the problem that a tab is likely to tear when the tab is formed by punching at an end of the current collector or when the tab is welded to a conductive component, or The strength enhancement layer is of a mesh structure, and the strength enhancement layer 1 of the mesh structure is conducive to ensuring the bending resistance of the current collector while enhancing the strength of the current collector, so that the current collector can be easily wound into a roll.

In some embodiments, the strength enhancement layer is provided with a through hole to allow the battery fluid on two sides of the strength enhancement layer 2 to flow to the opposite side.

In some embodiments, the current collecting layer are respectively provided on two sides of the strength enhancement layer, and the strength enhancement layer and the two current collecting layers are provided side by side in a thickness direction of the current collector, the strength enhancement layer being located between the two current collecting layers.

In some embodiments, the foam metal portion has a porosity of 20% to 95%, which ensures sufficient contact between the foam metal portion and the active material of the battery and can also ensure that the current collector has good bending resistance. Optionally, the foam metal portion has a porosity of 85% to 90%, so that the battery has high volumetric energy density.

In some embodiments, the foam metal portion comprises a pore channel extending from the side away from the strength enhancement layer to the side close to the strength enhancement layer, the pore channel being tortuous.

In some embodiments, the pore channel has a tortuosity t of 1.21-1.33, wherein $t=1+\ln(1/\varepsilon^2)$, c representing the porosity. The smaller the tortuosity is, the more favorable a lithium intercalation process, so as to improve the charge/discharge performance of the battery.

In some embodiments, the strength enhancement layer has a thickness of 4-12 μm, which ensures that the current collector has good mechanical properties and can also ensure that the current collector has good bendability; and/or the current collecting layer has a thickness of 20-400 μm, which ensures sufficient contact between the foam metal portion and the active material of the battery and can also ensure that the current collector has good bending resistance.

In some embodiments, the foam metal portion is made of copper, and the solid metal portion is made of one of a copper-zinc alloy, a copper-aluminum alloy, a copper-manganese alloy and a copper-iron alloy; or the foam metal portion is made of nickel, and the solid metal portion is made of a nickel-manganese alloy; or the foam metal portion is made of titanium, and the solid metal portion is made of one of a titanium-scandium alloy, a titanium-copper alloy and a platinum-titanium-copper alloy; and or lithe foam metal portion is made of gold, and the solid metal portion is made of a gold-silver alloy.

According to another aspect of the present application, a preparation method for a current collector is further provided, the method comprising:

a bonding step comprising stacking an alloy foil for forming a current collecting layer with a strength enhancement layer, and bonding the alloy foil and the strength enhancement layer; and a foam forming step comprising attaching an anti-corrosion material layer locally on the alloy foil to form an intermediate body to be subjected to foam forming, and placing the intermediate body in a corrosive solution to remove one or more elements from the portion of the alloy foil that is not attached with the anti-corrosion material layer such that the alloy foil forms the foam metal portion, with the portion of the alloy foil that is attached with the anti-corrosion material layer forming the solid metal portion.

In some embodiments, the corrosive solution includes at least one of a dilute hydrochloric acid solution, an ammonium sulfate solution, an electrolytic solution obtained by mixing $H_2SO_4$ and $MnSO_4$, an acetic acid solution, a phosphoric acid solution, and a sulfuric acid solution.

In some embodiments, the alloy foil for forming the current collecting layer is bonded to the strength enhancement layer by rolling.

According to another aspect of the present application, a secondary battery is further provided, comprising the current collector described above or a current collector prepared by means of the preparation method described above.

According to another aspect of the present application, a battery module is further provided.

The battery module comprises the secondary battery described above.

According to another aspect of the present application, a battery pack is further provided. The battery pack comprises the battery module described above.

According to another aspect of the present application, a power consuming device is further provided. The power consuming device comprises at least one of the secondary battery, the battery module and the battery pack described above.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without creative efforts.

Figure 1:
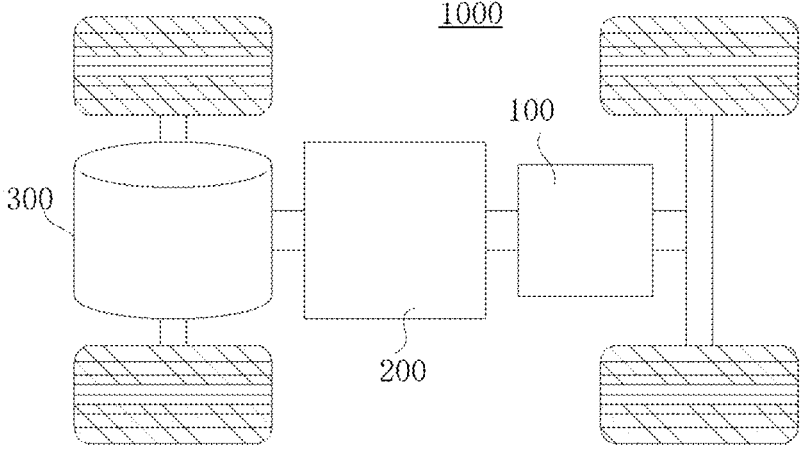
FIG. 1 shows a schematic structural diagram of a vehicle disclosed in some embodiments of the present application.

In the accompanying drawings, the figures are not drawn to scale.

LIST OF REFERENCE NUMERALS

1000. vehicle; 100. battery; 200. controller; 300. motor; 110. case; 111. first portion; 112. second portion; 120. battery unit; 121. end cap; 121a. electrode terminal; 122. housing; 123. cell assembly; 123a. tab; 1. strength enhancement layer; 2. current collecting layer; 21. foam metal portion; and 22. solid metal portion.

DETAILED DESCRIPTION OF EMBODIMENTS

The implementations of the present application will be further described in detail below in conjunction with the accompanying drawings and embodiments. The following detailed description of the embodiments and the accompanying drawings are used to illustrate the principle of the present application by way of example, but shall not be used to limit the scope of the present application. That is, the present application is not limited to the described embodiments.

In the description of the present application, it should be noted that "a plurality of" means at least two, unless otherwise specified. the orientation or a position relationship indicated by the terms "upper", "lower", "left", "right", "inner", "outer", etc. is for convenience of describing the present application and simplifying the description only, rather than indicating or implying that the device or element referred to must have a particular orientation or be constructed and operated in a particular orientation, and therefore should not be construed as a limitation on the present application. In addition, the terms "first", "second", "third", etc. are used for descriptive purposes only, and shall not be construed as indicating or implying relative importance. The term "perpendicular" does not mean being perpendicular in the strict sense, but within an allowable range of errors. The term "parallel" does not mean being parallel in the strict sense, but within an allowable range of errors.

The orientation terms in the following description all indicate directions shown in the drawings, but do not limit the specific structure in the present application. In the description of the present application, it should also be noted that the terms "mounting", "connecting" and "connection" should be interpreted in a broad sense, unless explicitly specified and defined otherwise, which, for example, may be a fixed connection, a detachable connection or an integral connection, or may be a direct connection, or an indirect connection through an intermediate medium. For those of ordinary skill in the art, the specific meaning of the terms mentioned above in the present application can be construed according to specific circumstances.

Further, "ranges" disclosed in the present application are defined in the form of lower and upper limits, where a given range is defined by the selection of a lower limit and an upper limit, and the selected lower limit and the upper limit define the boundaries of a particular range. Ranges defined in this manner may be inclusive or exclusive, and may be arbitrarily combined, that is, any lower limit may be combined with any upper limit to form a range. For example, if the ranges of 60-120 and 80-110 are listed for a particular parameter, it should be construed that the ranges of 60-110 and 80-120 are also contemplated. In addition, if minimum range values 1 and 2 are listed, and maximum range values 3, 4, and 5 are listed, the following ranges are all contemplated: 1-3, 1-4, 1-5, 2-3, 2-4 and 2-5. In the present application, unless stated otherwise, the numerical range "a-b" denotes an abbreviated representation of any combination of real numbers between a and b, where both a and b are real numbers. For example, the numerical range "0-5" means that all real numbers between "0-5" have been listed herein, and "0-5" is just an abbreviated representation of combinations of these numerical values. In addition, when a parameter is expressed as an integer ≥2, it is equivalent to disclosing that the parameter is, for example, an integer of 2, 3, 4, 5, 6, 7, 8, 9, 10, 11, 12, and so on.

All the embodiments and optional embodiments of the present application can be combined with one another to form new technical solutions, unless otherwise stated.

All technical features and optional technical features of the present application can be combined with one another to form a new technical solution, unless otherwise stated.

All the steps of the present application can be performed sequentially or randomly, preferably sequentially, unless stated otherwise. For example, the method including steps (a) and (b) indicates that the method may include steps (a) and (b) performed sequentially, and may also include steps (b) and (a) performed sequentially. For example, reference to "the method may further include step (c)" indicates that step (c) may be added to the method in any order, e.g., the method may include steps (a), (b) and (c), or steps (a), (c) and (b), or steps (c), (a) and (b), etc.

The terms "comprising" and "including" mentioned in the present application are open-ended or closed-ended, unless otherwise stated. For example, the terms "comprising" and "including" may mean that other components not listed may also be comprised or included, or only the listed components may be comprised or included.

In the present application, the term "or" is inclusive, unless otherwise specified. For example, the phrase "A or B" means "A, B, or both A and B". More specifically, the condition "A or B" is satisfied by any one of the following: A is true (or present), and B is false (or not present); A is false (or not present), and B is true (or present); or both A and B are true (or present).

At present, from the perspective of the development of the market situation, the traction batteries are used more and more widely. The traction batteries are not only used in energy storage power systems such as hydroelectric power plants, thermal power plants, wind power plants and solar power plants, but also widely used in electric transportation means such as electric bicycles, electric motorcycles and electric vehicles and in many fields such as military equipment and aerospace. With the continuous expansion of the application field of traction batteries, the market demand for the traction batteries is also expanding.

FIG. 1 shows a schematic structural diagram of a power consuming device using a battery as a power source. As shown in FIG. 1, the power consuming device of this embodiment comprises a vehicle 1000. The vehicle 1000 may be a battery electric vehicle, a hybrid electric vehicle, an extended-range electric vehicle, etc. The vehicle 1000 is provided with a battery pack 100 inside, and the battery pack 100 may be provided at the bottom, the front or the rear of the vehicle 1000. The battery pack 100 may be used to supply power to the vehicle 1000. For example, the battery pack 100 may serve as an operation power source of the vehicle 1000. The vehicle 1000 may further comprise a controller 200 and a motor 300. The controller 200 is used for controlling the battery pack 100 to supply power to the motor 300, for example, for meeting the working power demand during startup, navigation and traveling of the vehicle 1000.

In some embodiments of the present application, the battery pack 100 may not only serve as an operation power source for the vehicle 1000, but also serve as a driving power source for the vehicle 1000, instead of or partially instead of fuel or natural gas, to provide driving power for the vehicle 1000.

Figure 2:
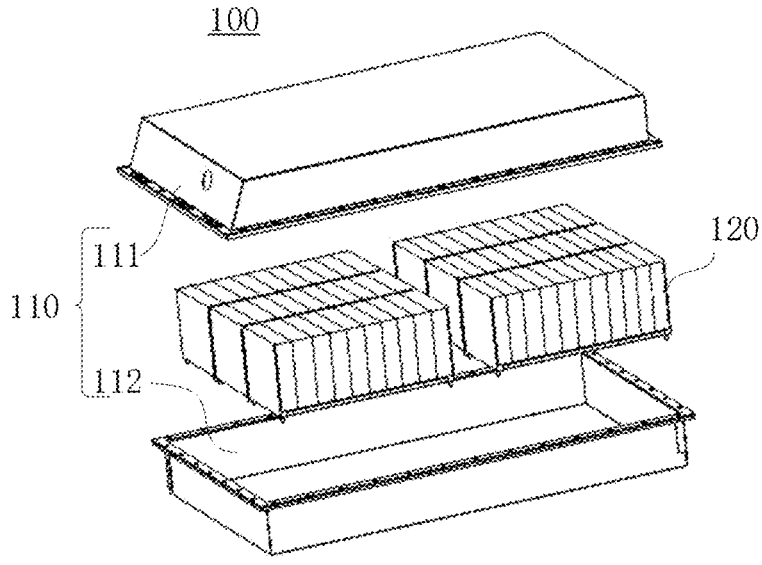
FIG. 2 shows a schematic exploded structural diagram of a battery pack disclosed in some embodiments of the present application.

Referring to FIG. 2, FIG. 2 is an exploded view of the battery pack 100 provided in some embodiments of the present application. The battery pack 100 comprises a case 110 and a battery module provided in the case 110. The battery module comprises a plurality of battery units 120, the battery units 120 being accommodated in the case 110. The case 110 is used to provide an accommodating space for the battery units 120, and the case 110 may be of various structures. In some embodiments, the case 110 may comprise a first portion 111 and a second portion 112. The first portion 111 and the second portion 112 are fitted to each other in a covered manner, and the first portion 111 and the second portion 112 together define an accommodating space for accommodating the battery units 120. The second portion 112 may be of a hollow structure with one end open, the first portion 111 may be of a plate-like structure, and the first portion 111 is fitted to an open side of the second portion 112 in a covered manner such that the first portion 111 and the second portion 112 together define the accommodating space; and the first portion 111 and the second portion 112 may also be of a hollow structure with one side open, and an open side of the first portion 111 is fitted to the open side of the second portion 112 in a covered manner. Of course, the case 110 formed by the first portion 111 and the second portion 112 may be in various shapes such as a cylinder and a cuboid.

In the battery pack 100, a plurality of battery units 120 may be provided. The plurality of battery units 120 may be connected in series, in parallel, or in series and parallel. The parallel-series connection means that the plurality of battery units 120 are connected both in series and in parallel. The plurality of battery units 120 may be directly connected in series or in parallel or in series and parallel, and then a whole body composed of the plurality of battery units 120 is received in the case 110; and of course, the battery pack 100 may also be in the form that a plurality of battery units 120 are firstly connected in series or in parallel or in series and parallel to form a battery module, and then a plurality of battery modules are connected in series or in parallel or in series and parallel to form a whole body and are received in the case 110. The battery pack 100 may further comprise other structures. For example, the battery pack 100 may further comprise a busbar component for achieving electrical connection of the plurality of battery units 120.

Each battery unit 120 may be a secondary battery or a primary battery, and may also be a lithium-sulfur battery, a sodium-ion battery, or a magnesium-ion battery, but is not limited thereto. The battery unit 120 may be in cylindrical, flat, cuboid, or other shapes.

Figure 3:
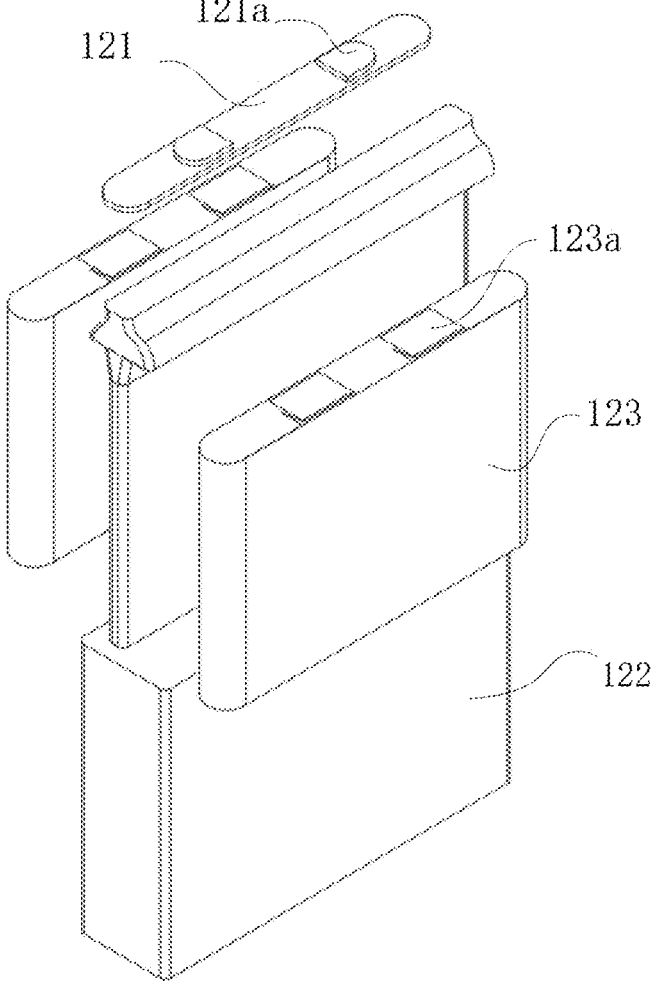
FIG. 3 shows a schematic partial structural diagram of a battery module disclosed in some embodiments of the present application.

Referring to FIG. 3, FIG. 3 is a schematic exploded structural diagram of a battery unit 120 provided in some embodiments of the present application. The battery unit 120 refers to the smallest unit of the battery pack 100. As shown in FIG. 3, the battery unit 120 comprises an end cap 121, a housing 122, a cell assembly 123 and other functional components.

The end cap 121 refers to a component that covers an opening of the housing 122 to isolate an internal environment of the battery unit 120 from an external environment. Without limitation, the end cap 121 may have a shape adapted to that of the housing 122 to fit with the housing 122. Optionally, the end cap 121 may be made of a material with certain hardness and strength, such as an aluminum alloy, and thus the end cap 121 is not easily deformed when being pressed or collided, so that the battery unit 120 can have higher structural strength, and the safety performance can also be improved. Functional components, such as electrode terminals 121a, may be provided on the end cap 121. The electrode terminals 121a may be used for electrical connection to the cell assembly 123 for outputting or inputting electrical power of the battery unit 120. In some embodiments, a pressure relief mechanism, which is used to release internal pressure when the internal pressure or temperature of the battery unit 120 reaches a threshold, may be further provided on the end cap 121. The end cap 21 may also be made of various materials, such as copper, iron, aluminum, stainless steel, an aluminum alloy and plastic, which is not particularly limited in the embodiments of the present application. In some embodiments, an insulating member may be further provided on an inner side of the end cap 121. The insulating member may be used to isolate electrical connection components within the housing 122 from the end cap 121 so as to reduce the risk of short circuiting. Illustratively, the insulating member may be made of plastic, rubber, etc.

The housing 122 is an assembly that is used to fit with the end cap 121 to form the internal environment of the battery unit 120, where the formed internal environment may be used for accommodating the cell assembly 123, an electrolytic solution and other components. The housing 122 and the end cap 121 may be separate components, and the housing 122 may be provided with an opening, at which the end cap 121 covers the opening to form the internal environment of the battery unit 120. Without limitation, the end cap 121 and the housing 122 may also be integrated. Specifically, the end cap 121 and the housing 122 can firstly form a common connection surface before other components are placed into the housing, and then the end cap 121 covers the housing 122 when the interior of the housing 122 needs to be packaged. The housing 122 may be in various shapes and various sizes, for example, in the shape of a cuboid, a cylinder, a hexagonal prism, etc. Specifically, the shape of the housing 122 may be determined according to the specific shape and size of the cell assembly 123. The housing 122 may be made of various materials, such as copper, iron, aluminum, stainless steel, an aluminum alloy and plastic, which is not particularly limited in the embodiments of the present application.

The cell assembly 123 is a component, where an electrochemical reaction occurs, in the battery unit 100. The housing 122 may comprise one or more cell assemblies 123 therein. The cell assembly 123 is mainly formed by winding or stacking electrode plates, where the electrode plates include a positive electrode plate and a negative electrode plate, and an isolation film is usually provided between the positive electrode plate and the negative electrode plate.

The electrode plate mainly comprises a sheet-like current collector and an active material coated on the current collector. The portions of the positive electrode plate and the negative electrode plate that have the active material constitute a main body portion of the cell assembly, and the portions of the positive electrode plate and the negative electrode plate that have no active material each constitute a tab 123a. The positive electrode tab and the negative electrode tab can be both located at one end of the main body or respectively at two ends of the main body. During the charge/discharge process of the battery pack 100, the positive electrode active substance and the negative active material react with the electrolytic solution, and the tabs 123a are connected to the electrode terminals to form a current loop.

[Positive Electrode Plate]

The positive electrode plate comprises a positive current collector and a positive film layer provided on at least one surface of the positive current collector, the positive film layer comprising a positive active material.

As an example, the positive current collector has two surfaces opposite in its own thickness direction, and the positive film layer is provided on either or both of opposite surfaces of the positive current collector.

In some embodiments, the positive current collector may be a metal foil or a composite current collector, and the positive current collector may also be a current collector set forth in the present application. For example, as a metal foil, an aluminum foil can be used. The composite current collector may comprise a polymer substrate and a metal layer formed on at least one surface of the polymer substrate. The composite current collector may be formed by forming a metal material (aluminum, an aluminum alloy, nickel, a nickel alloy, titanium, a titanium alloy, silver, a silver alloy, etc.) on a polymer substrate (e.g., polypropylene (PP), polyethylene terephthalate (PET), polybutylene terephthalate (PBT), polystyrene (PS) and polyethylene (PE)).

In some embodiments, the positive active material may be a positive active material known in the art for batteries. As an example, the positive active material may include at least one of the following materials: lithium-containing phosphates of an olivine structure, lithium transition metal oxides and their respective modified compounds. However, the present application is not limited to these materials, and other conventional materials that can be used as positive active materials for batteries may also be used. These positive active materials may be used alone or in combination of two or more. Herein, examples of lithium transition metal oxides may include, but are not limited to, at least one of lithium cobalt oxide (e.g., $LiCoO_2$), lithium nickel oxide (e.g., $LiNiO_2$), lithium manganese oxide (e.g., $LiMnO_2$, $LiMn_2O_4$), lithium nickel cobalt oxide, lithium manganese cobalt oxide, lithium nickel manganese oxide, lithium nickel cobalt manganese oxide (e.g., $LiNi_{1/3}Co_{1/3}Mn_{1/3}O_2$ (also referred to as $NCM_{333}$), $LiNi_{0.5}Co_{0.2}Mn_{0.3}O_2$ (also referred to as $NCM_{523}$), $LiNi_{0.5}Co_{0.25}Mn_{0.25}O_2$ (also referred to as $NCM_{211}$), $LiNi_{0.6}Co_{0.2}Mn_{0.2}O_2$ (also referred to as $NCM_{622}$), $LiNi_{0.8}Co_{0.1}Mn_{0.1}O_2$ (also referred to as $NCM_{811}$)), lithium nickel cobalt aluminum oxide (e.g., $LiNi_{0.85}Co_{0.15}Al_{0.05}O_2$), and modified compounds thereof, etc. Examples of lithium-containing phosphates of an olivine structure may include, but are not limited to, at least one of lithium iron phosphate (e.g., $LiFePO_4$ (also referred to as LFP)), lithium iron phosphate and carbon composites, lithium manganese phosphate (e.g., $LiMnPO_4$), lithium manganese phosphate and carbon composites, lithium iron manganese phosphate, and lithium iron manganese phosphate and carbon composites.

In some embodiments, the positive film layer may optionally comprise a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

In some embodiments, the positive film layer may optionally comprise a conductive agent. As an example, the conductive agent may include at least one of superconducting carbon, acetylene black, carbon black, Ketjenblack, carbon dots, carbon nanotubes, graphene, and carbon nanofibers.

In some embodiments, the positive electrode plate can be prepared as follows: dispersing the above-described components for preparing the positive electrode plate, such as a positive active material, a conductive agent, a binder and any other components, in a solvent (e.g., N-methylpyrrolidone) to form a positive slurry; and coating a positive current collector with the positive slurry, followed by the procedures such as drying and cold pressing, so as to obtain the positive electrode plate.

[Negative Electrode Plate]

The negative electrode plate comprises a negative current collector and a negative film layer provided on at least one surface of the negative current collector, the negative film layer comprising a negative active material.

As an example, the negative current collector has two surfaces opposite in its own thickness direction, and the negative film layer is provided on either or both of opposite surfaces of the negative current collector.

In some embodiments, the negative current collector may be a metal foil or a composite current collector, and the negative current collector may also be a current collector set forth in the present application. For example, the metal foil may be a copper foil. The composite current collector may comprise a polymer substrate and a metal layer formed on at least one surface of the polymer substrate. The composite current collector can be formed by forming a metal material (copper, a copper alloy, nickel, a nickel alloy, titanium, a titanium alloy, silver, a silver alloy, etc.) on a polymer substrate (e.g., polypropylene (PP), polyethylene terephthalate (PET), polybutylene terephthalate (PBT), polystyrene (PS) and polyethylene (PE)).

In some embodiments, the negative active material may be a negative active material known in the art for batteries. As an example, the negative active material may include at least one of the following materials: artificial graphite, natural graphite, soft carbon, hard carbon, silicon-based materials, tin-based materials, lithium titanate, etc. The silicon-based material may be selected from at least one of elemental silicon, a silicon oxide compound, a silicon carbon composite, a silicon nitrogen composite and a silicon alloy. The tin-based material may be selected from at least one of elemental tin, a tin oxide compound and a tin alloy. However, the present application is not limited to these materials, and other conventional materials that can be used as negative active materials for batteries can also be used. These negative active materials may be used alone or in combination of two or more.

In some embodiments, the negative film layer may optionally comprise a binder. The binder may be selected from at least one of butadiene styrene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some embodiments, the negative film layer may optionally comprise a conductive agent. The conductive agent may be selected from at least one of superconductive carbon, acetylene black, carbon black, Ketjenblack, carbon dots, carbon nanotubes, graphene, and carbon nanofibers.

In some embodiments, the negative film layer may optionally comprise other auxiliary agents, such as a thickener (e.g., sodium carboxymethyl cellulose (CMC-Na)).

In some embodiments, the negative electrode plate can be prepared as follows: dispersing the above-described components for preparing the negative electrode plate, such as a negative active material, a conductive agent, a binder and any other components, in a solvent (e.g., deionized water) to form a negative slurry; and coating a negative current collector with the negative slurry, followed by the procedures such as drying and cold pressing, so as to obtain the negative electrode plate.

[Electrolyte]

The electrolyte is located between the positive electrode plate and the negative electrode plate and functions for conducting ions. The type of the electrolyte is not specifically limited in the present application, and can be selected according to requirements. For example, the electrolyte may be in a liquid state, a gel state or an all-solid state.

In some embodiments, an electrolytic solution is used as the electrolyte. The electrolytic solution includes an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluorooxalate borate, lithium dioxalate borate, lithium difluorodioxalate phosphate and lithium tetrafluorooxalate phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

In some embodiments, the electrolytic solution may optionally include an additive. For example, the additive may include a negative electrode film-forming additive and a positive electrode film-forming additive, and may further include an additive that can improve certain performances of the battery, such as an additive that improves the overcharge performance of the battery, or an additive that improves the high temperature or low-temperature performance of the battery.

[Isolation Film]

In some embodiments, the secondary battery further comprises an isolation film. The type of the isolation film is not particularly limited in the present application, and any well-known isolation film of a porous structure with good chemical stability and mechanical stability may be selected.

In some embodiments, the isolation film may be made of a material selected from at least one of glass fiber, non-woven fabric, polyethylene, polypropylene and polyvinylidene fluoride. The isolation film may be a single-layer film, and may also be a multi-layer laminated film, which is not limited particularly. When the isolation film is a multi-layer laminated film, the respective layers may be made of the same or different materials, which is not limited particularly.

The inventors of the present application have noted that, when the electrode plates that use a foam metal foil as the current collector are wound into a roll or when multiple layers of electrode plates are stacked together, the foam metal foil is likely to be damaged by pressing. After the foam metal foil is broken, the contact area between the foam metal foil and the electrolyte is reduced, and the electrical energy storage performance of the battery decreases.

In order to solve the problem mentioned above, the inventors have found that the current collector in the form of a mixture of foam metal and solid metal is conducive to improving the capability of the current collector to resist the damage by pressing.

Figure 4:
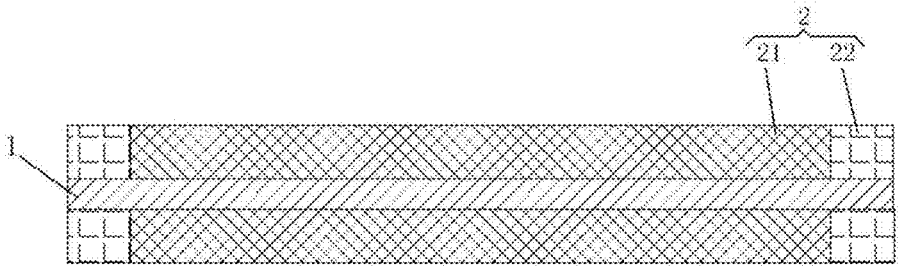
FIG. 4 shows a schematic structural diagram of a current collector disclosed in some embodiments of the present application.

On the basis of the objective mentioned above, the present application provides a current collector of a battery. As shown in FIG. 4, the current collector comprises a strength enhancement layer 1 and a current collecting layer 2. The current collecting layer 2 comprises a foam metal portion 21 and a solid metal portion 22, wherein the solid metal portion 22 can have a supporting function, which is conducive to preventing affection to the battery due to the foam metal portion 21 being damaged by pressing when the current collector is wound into a roll.

In some embodiments, the solid metal portion 22 extends in a length direction of the current collecting layer 2 such that the solid metal portion 22 can have a supporting function at various positions in the length direction of the current collecting layer 2 so as to prevent the foam metal portion 21 at the various positions of the current collecting layer 2 from being damaged by pressing.

In some embodiments, the current collecting layer 2 comprises a plurality of solid metal portions 22, a foam metal portion 21 is provided between two adjacent solid metal portions 22, and the solid metal portions 22 located on two sides of the foam metal portion 21 can function to protect the foam metal portion 21 and avoid the foam metal portion 21 located between the two solid metal portions 22 from being damaged by pressing.

In some embodiments, the solid metal portion 22 is provided at one or both ends of the strength enhancement layer 1 in a width direction. The solid metal portion 22 located at the end of the strength enhancement layer can function 1 to protect the foam metal portion 21 located on an inner side thereof against damage by pressing. Further, the solid metal portion 22 at the end in the width direction of the strength enhancement layer 1 is also used to form a tab. The tab formed by the solid metal portion 22 has the characteristics of high structural strength and good welding performance.

In some embodiments, the strength enhancement layer 1 is a sheet-like metal layer. The sheet-like metal layer in the present application is of a sheet-like structure that is non-porous inside, is a non-foam structure and is made of a metal material. It should be noted that the non-foam structure that is non-porous inside may have a through hole therethrough or surface pits. The battery current collector of this embodiment comprises the strength enhancement layer 1 which improves the poor mechanical properties of the current collector and is conducive to solving the problem that a tab is likely to tear when the tab is formed by punching at an end of the current collector or when the tab is welded to a conductive component.

In other embodiments, the strength enhancement layer 1 is of a mesh structure. The strength enhancement layer 1 of the mesh structure is conducive to ensuring the bending resistance of the current collector while enhancing the strength of the current collector, so that the current collector can be easily wound into a roll.

In some embodiments, the strength enhancement layer 1 is made of copper, and the copper strength enhancement layer 1 not only enhances the mechanical properties of the current collector, but also enables the current collector to have good weldability and electrical conductivity, and is further conducive to ensuring the bending resistance of the current collector to prevent the current collector from breaking during coiling into a roll. The strength enhancement layer 1 may also be made of other materials with good strength, electrical conductivity, and ductility and toughness, such as nickel, aluminum, iron, magnesium, titanium, steel and an alloy.

In some embodiments, the current collecting layers 2 are respectively provided on two sides of the strength enhancement layer 1, and the strength enhancement layer 1 and the two current collecting layers 2 are provided side by side in a thickness direction of the current collector, the strength enhancement layer 1 being located between the two current collecting layers 2, so that the current collector satisfies the characteristics of a symmetrical electrode structure.

In some embodiments, the strength enhancement layer 1 is provided with a through hole to allow the battery fluid on two sides of the strength enhancement layer 2 to flow to the opposite side.

The foam metal portion 21 has a porosity of 20% to 95%. Optionally, the foam metal portion 21 has a porosity of 85% to 90%. The porosity refers to the percentage of the volume of pores inside a porous solid material to the total volume of the material in a natural state. The greater the porosity of the foam metal portion 21, the greater the contact area between the foam metal portion 21 and an active material of the battery. However, the bending resistance of the corresponding foam metal portion 21 becomes poor, and the current collector is prone to cracking during winding into a roll.

The foam metal portion 21 has a porosity of 20% to 90%, which ensures sufficient contact between the foam metal portion 21 and the active material of the battery and can also ensure that the current collector has good bending resistance.

In other embodiments, the foam metal portion 21 has a porosity of 85% to 90%, and the battery using a battery current collector in which the foam metal portion 21 has a porosity of 85% to 90% has high volumetric energy density.

The foam metal portion 21 comprises a pore channel extending from the side away from the strength enhancement layer 1 to the side close to the strength enhancement layer 1, the pore channel being tortuous. The pore channel has a tortuosity t of 1.21-1.33, wherein $t=1+\ln(1/\varepsilon^2)$, representing the porosity. The smaller the tortuosity, the more favorable a lithium intercalation process.

The following table shows experimental data of a battery current collector using the technical means of this embodiment and a battery current collector of a comparative example. The examples described below are exemplary and are merely for explaining the present application, and should not be construed as limiting the present application. The examples in which techniques or conditions are not specified are based on the techniques or conditions described in documents in the art or according to the product introduction. The reagents or instruments used therein for which manufacturers are not specified are all conventional products that are commercially available.

The parameter and performance tests of the battery current collectors of the examples and the comparative examples are shown in the following table:

ride (PVDF) as a binder were stirred and mixed well, according to the weight ratio of 90.5:4.5:3:2, in a N-methylpyrrolidone solvent system, and then coated on an aluminum foil with a coating amount per unit area of 18.9 mg/cm², followed by drying and cold pressing, so as to obtain a positive electrode plate.

| | Length of tab/mm | Thickness of enhancement layer/μm | Porosity | Mass energy density | Tortuosity | State of current collector |
|---|---|---|---|---|---|---|
| Comparative example | None | None | 70% | / | / | The foam metal portion was damaged and could not be used as a secondary battery current collector |
| Comparative example | 7.5 | 4.5 | 70% | Compared with Base group, decreased by 5.9% | 1.71 | The foam metal portion was intact and could be used as a secondary battery current collector |
| Example 1 | 7.5 | 4.5 | 80% | Base group | 1.45 | The foam metal portion was intact and could be used as a secondary battery current collector |
| Example 2 | 7.5 | 4.5 | 85% | Compared with Base group, increased by 2.8% | 1.33 | The foam metal portion was intact and could be used as a secondary battery current collector |
| Example 3 | 7.5 | 4.5 | 88% | Compared with Base group, increased by 4.4% | 1.26 | The foam metal portion was intact and could be used as a secondary battery current collector |
| Example 4 | 7.5 | 4.5 | 90% | Compared with Base group, increased by 5.4% | 1.21 | The foam metal portion was intact and could be used as a secondary battery current collector |

The symbol "/" in the table indicates that testing is not possible.

A testing method for the mass energy density of a secondary battery comprises preparing the secondary battery and testing the mass energy density of the secondary battery.

The preparation method for the secondary battery is as follows.

1. LFP (LiFePO$_4$, lithium iron phosphate) as a positive active material, Li$_6$CoO$_4$ as a lithium-rich material, acetylene black as a conductive agent, and polyvinylidene fluo- 2. The current collectors in the examples 1 to 4 and the comparative examples were directly used as a negative electrode plate.

3. A porous polymeric thin film made of polyethylene (PE) was used as an isolation film.

4. The positive electrode plate, the isolation film and the negative electrode plate were stacked in sequence, with the isolation film being located between the positive electrode and the negative electrode to have an isolation function, and were wound to obtain a bare cell. The bare cell was placed in an outer package, injected with an electrolytic solution, with a concentration of 1 M, of lithium hexafluorophosphate (20% ethylene carbonate and 30% dimethyl carbonate as solvents, and 50% methyl ethyl carbonate), and encapsulated to obtain the secondary battery.

The testing method for the mass energy density of the secondary battery is as follows.

1. The secondary batteries prepared as above were left standing in a 25° C. constant-temperature environment for 10 min and then discharged to 2.5 V according to ⅓ C; were left standing for another 30 min and then charged to 3.65 V according to ⅓ C; and then were charged under constant voltage of 3.65 V until the current≤0.05 C, were left standing for another 30 min, with the charging capacity at this moment being recorded as C0, and then were discharged to 2.5 V according to ⅓ C, with the discharging capacity at this moment being recorded as D0 as an initial discharging capacity.

2. The test value of discharging capacity (i.e., the initial discharging capacity D0) was multiplied by a plateau voltage U of the system and then divided by the weight W of the battery to obtain the mass energy density of the battery.

A testing method for the tortuosity is as follows.

First, the testing for the porosity c was carried out using a gas adsorption method.

1. Pretreatment: an appropriate amount of a sample was taken with a special sample tube, was heated and subjected to vacuum degassing for 2 h, and was cooled to the room temperature and then weighed to obtain a total weight, and the mass of the sample tube was subtracted from the total weight to obtain the sample mass.

2. Testing: the sample tube was loaded into a workstation and was measured at a constant low-temperature to obtain the adsorption amount of gas on a solid surface under different adsorption pressures, and then the monomolecular layer adsorption quantity of the sample was calculated on the basis of the BET adsorption theory and the formula thereof so as to calculate the specific surface area of the solid sample per unit mass.

3. Adsorbed gas: nitrogen, adsorption pressure points: 0.05/0.10/0.15/0.20/0.25/0.30 kPa, and testing atmosphere: high-purity liquid nitrogen atmosphere, with the purity of liquid nitrogen≥99.99%.

Then, the tortuosity was calculated using the BERNARD P. BOUDREAU formula $t=1+\ln(1/\varepsilon^2)$.

The preparation process for a current collector in the comparative example in the above table is as follows.

In a first step, an alloy of 30% Cu and 70% Mn was obtained by means of vacuum smelting.

In a second step, alloy treatment, in which impurities, such as oxide scale, in the alloys obtained in the first step were removed, specifically, the impurities, such as the oxide scale, were removed by means of mechanical polishing.

In a third step, primary rolling, the alloys obtained in the second step were primarily rolled to obtain an alloy plate with a thickness of 0.1-0.5 mm for later use.

In a fourth step, composite rolling, the alloy plate obtained in the third step and a pure copper foil were stacked in a stacked manner of the alloy plate/the copper foil/the alloy plate, and then subjected to hot rolling to obtain a foil with a thickness of 80 μm, with the temperature during the hot rolling being 850° C.

In a fifth step, adhesive tape application, two sides of one end of the foil obtained in the fourth step were treated by means of adhesive tape application, with the width of adhesive tape being 7.5 mm, and the applied adhesive tape being a commercially available common blue adhesive tapes with a thickness of 60 μm.

In a sixth step, dealloying, the foil obtained in the fifth step was dealloyed to remove metal Mn by corrosion by means of placing a sample in an aqueous hydrochloric acid solution with a concentration of 5 wt % at the room temperature for 24 h, taking out the sample after the corrosion, and placing the sample in DI water for ultrasonic cleaning for 4 h.

In a seventh step, adhesive tape removal and drying, the adhesive tape applied in the fifth step was removed, and the sample obtained in the sixth step was dried in a vacuum oven at 45° C. to obtain a porous foam current collector, with the portion where the adhesive tape was applied forming a solid metal portion 22, and the portion where the adhesive tape was not applied forming a foam metal portion due to the corrosion of part of the alloy by hydrochloric acid.

The preparation process for a current collector in the comparative example is as follows.

The preparation process is the same as that of the comparative example, except that the enhancement layer was not formed.

The preparation process for a current collector in example 1 is as follows.

In a first step, an alloy of 20% Cu and 80% Mn was obtained by means of vacuum smelting.

The subsequent treatment steps were the same as those of the comparative example.

The preparation process for a current collector in example 2 is as follows.

In a first step, an alloy of 15% Cu and 85% Mn was obtained by means of vacuum smelting.

The subsequent treatment steps were the same as those of the comparative example.

The preparation process for a current collector in example 3 is as follows.

In a first step, an alloy of 12% Cu and 88% Mn was obtained by means of vacuum smelting.

The subsequent treatment steps were the same as those of the comparative example.

The preparation process for a current collector in example 4 is as follows.

In a first step, an alloy of 10% Cu and 90% Mn was obtained by means of vacuum smelting.

The subsequent treatment steps were the same as those of the comparative example.

As can be seen from the preparation processes for a current collectors in the comparative example and the examples described above, the foam metal portion 21 of the current collecting layer 2 is formed by means of removing part of metal elements in the alloy metal with a corrosive solution, and thus the portion that is protected by the applied adhesive tape and is thus not corroded forms the solid metal portion 22.

Specifically, the foam metal portion 21 is made of copper, and the solid metal portion 22 is made of one of a copper-zinc alloy, a copper-aluminum alloy, a copper-manganese alloy and a copper-iron alloy; or the foam metal portion 21 is made of nickel, and the solid metal portion 22 is made of a nickel-manganese alloy; or the foam metal portion 21 is made of titanium, and the solid metal portion 22 is made of one of a titanium-scandium alloy, a titanium-copper alloy and a platinum-titanium-copper alloy; or the foam metal portion 21 is made of gold, and the solid metal portion 22 is made of a gold-silver alloy.

In some embodiments, the strength enhancement layer 1 has a thickness of 4 to 12 μm. The greater the thickness of the strength enhancement layer 1, the better the mechanical properties of the current collector, but accordingly, the poorer the bendability of the current collector, so that the current collector is not easy to be wound into a roll. The strength enhancement layer 1 has a thickness of 4 to 12 μm, and can ensure that the current collector has good bendability while ensuring that the current collector has good mechanical properties.

In some embodiments, the current collecting layer 2 has a thickness of 20-400 μm. If the foam metal portion 21 has excessively small thickness, the foam metal portion 21 has less pores accordingly, and the contact surface between the foam metal portion 21 and the active material in the battery is also smaller; and if the foam metal portion 21 has excessively large thickness, the bending resistance of the foam metal portion 21 becomes poor, and the current collector is prone to cracking during winding into a roll. The foam metal portion 21 has a thickness of 20 to 400 μm, which ensures sufficient contact between the foam metal portion 21 and the active material of the battery and can also ensure that the current collector has good bending resistance.

FIG. 4 shows a schematic structural diagram of a current collector of some embodiments of the present application. As shown in conjunction with FIG. 4, the current collector of this embodiment comprises a strength enhancement layer 1 and two current collecting layers 2 respectively provided on two sides of the strength enhancement layer. The current collecting layer 2 comprises a foam metal portion 21 and two solid metal portions 22 located at two ends of the foam metal portion 21 in the width direction of the current collector. The foam metal portions 21 of the two current collecting layers 2 have a porosity of 85% to 90%. The current collecting layers 2 have a thickness of 70 to 80 μm. The strength enhancement layer 1 has a thickness of 5 to 6 μm. The solid metal portion 22 is located at one end of the current collecting layer 2 in the width direction of the current collector and extends in the length direction of the current collector, and the solid metal portion 22 has a width of 8 mm. The solid metal portion 22 penetrates the entire current collecting layer 2 in the thickness direction.

Figure 5:
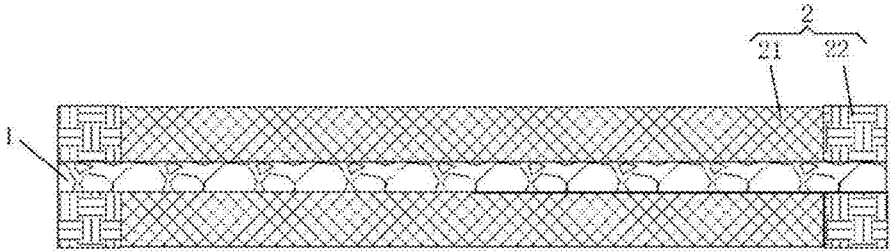
FIG. 5 shows a schematic structural diagram of a current collector disclosed in other embodiments of the present application.

FIG. 5 shows a schematic structural diagram of a current collector of some embodiments of the present application. As shown in conjunction with FIG. 5, the current collector of this embodiment comprises a strength enhancement layer 1 and two current collecting layers 2 respectively provided on two sides of the strength enhancement layer. The current collecting layer 2 comprises a foam metal portion 21 and two solid metal portions 22 located at two ends of the foam metal portion 21 in the width direction of the current collector. The foam metal portions 21 of the two current collecting layers 2 have a porosity of 65% to 80%. The current collecting layers 2 have a thickness of 110 to 125 μm. The strength enhancement layer 1 has a thickness of 5 to 6 μm. The solid metal portion 22 is located at one end of the current collecting layer 2 in the width direction of the current collector and extends in the length direction of the current collector, and the solid metal portion 22 has a width of 7 mm. The solid metal portion 22 penetrates the entire current collecting layer 2 in the thickness direction.

Figure 6:
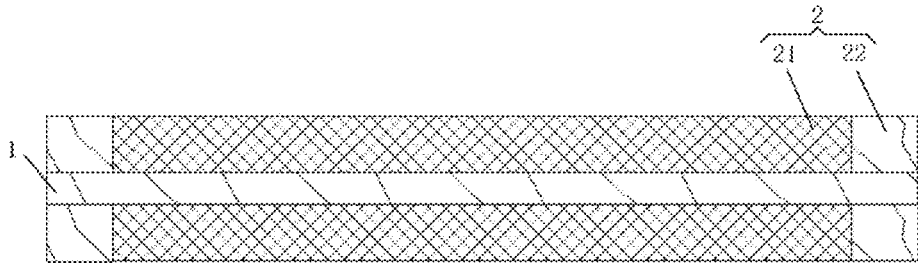
FIG. 6 shows a schematic structural diagram of a current collector disclosed in other embodiments of the present application.

FIG. 6 shows a schematic structural diagram of a current collector of some embodiments of the present application. As shown in conjunction with FIG. 6, the current collector of this embodiment comprises a strength enhancement layer 1 and two current collecting layers 2 respectively provided on two sides of the strength enhancement layer. The current collecting layer 2 comprises a foam metal portion 21 and two solid metal portions 22 located at two ends of the foam metal portion 21 in the width direction of the current collector. The foam metal portions 21 of the two current collecting layers 2 have a porosity of 40% to 55%. The current collecting layers 2 have a thickness of 40 to 50 μm. The strength enhancement layer 1 has a thickness of 7 to 9 μm. Optionally, the strength enhancement layer 1 is a copper foil having a through hole. The solid metal portion 22 is located at one end of the current collecting layer 2 in the width direction of the current collector and extends in the length direction of the current collector, and the solid metal portion 22 has a width of 7 mm. The solid metal portion 22 penetrates the entire current collecting layer 2 in the thickness direction.

According to another aspect of the present application, this embodiment further provides a preparation method for a current collector, the method comprising a bonding step and a foam forming step.

The bonding step comprises stacking an alloy foil for forming a current collecting layer 2 with a strength enhancement layer 1, and bonding the alloy foil and the strength enhancement layer.

The foam forming step comprises attaching an anti-corrosion material layer locally on the alloy foil to form an intermediate body to be subjected to foam forming, and placing the intermediate body in a corrosive solution to remove one or more elements from the portion of the alloy foil that is not attached with the anti-corrosion material layer such that the alloy foil forms the foam metal portion 21, with the portion of the alloy foil that is attached with the anti-corrosion material layer forming the solid metal portion 22.

The corrosive solution includes at least one of a dilute hydrochloric acid solution, an ammonium sulfate solution, an electrolytic solution obtained by mixing $H_2SO_4$ and $MnSO_4$, an acetic acid solution, a phosphoric acid solution, and a sulfuric acid solution. Optionally, the corrosive solution has a concentration of 1 vol. % to 85 vol. %.

The alloy foil for forming the current collecting layer 2 is bonded to the strength enhancement layer 1 by rolling. The roll bonding refers to a bonding method by which alloy plates are stacked and then integrated by means of strong plastic or thermoplastic deformation.

While the present application has been described with reference to the preferred embodiments, various modifications may be made, and equivalents may be provided to substitute for the components thereof without departing from the scope of the present application. In particular, the technical features mentioned in the embodiments can be combined in any manner, as long as there is no structural conflict. The present application is not limited to the specific embodiments disclosed herein, but includes all technical solutions that fall within the scope of the claims.

The invention claimed is:

1. A current collector, comprising:
   a strength enhancement layer; and
   a current collecting layer stacked and bonded with the strength enhancement layer, the current collecting layer comprising a foam metal portion and a solid metal portion side by side on a surface of the strength enhancement layer, wherein the solid metal portion is provided at one or both ends of the strength enhancement layer in a width direction.

2. The current collector according to claim 1, wherein the solid metal portion extends in a length direction of the current collecting layer.

3. The current collector according to claim 1, wherein the solid metal portion comprises a plurality of solid metal portions, with the foam metal portion being provided between two adjacent solid metal portions among the plurality of solid metal portions.

4. The current collector according to claim 1, wherein the strength enhancement layer is a metal layer having a sheet structure; or the strength enhancement layer is of a mesh structure.

5. The current collector according to claim 4, wherein the strength enhancement layer is provided with a through hole.

6. The current collector according to claim 1, wherein the current collecting layer comprises two current collecting layers, the two current collecting layers are respectively provided on two sides of the strength enhancement layer, and the strength enhancement layer and the two current collecting layers are provided side by side in a thickness direction of the current collector, the strength enhancement layer being located between the two current collecting layers.

7. The current collector according to claim 1, wherein the foam metal portion has a porosity of 20% to 95%.

8. The current collector according to claim 1, wherein the foam metal portion comprises a pore channel extending from a side away from the strength enhancement layer to a side close to the strength enhancement layer, the pore channel being tortuous.

9. The current collector according to claim 8, wherein the pore channel has a tortuosity t of 1.21-1.33, $t=1+\ln(1/\varepsilon^2)$, $\varepsilon$ representing the porosity.

10. The current collector according to claim 1, wherein the strength enhancement layer has a thickness of 4-12 µm; and/or the current collecting layer has a thickness of 20-400 µm.

11. The current collector according to claim 1, wherein the foam metal portion is made of copper, and the solid metal portion is made of one of a copper-zinc alloy, a copper-aluminum alloy, a copper-manganese alloy and a copper-iron alloy; or the foam metal portion is made of nickel, and the solid metal portion is made of a nickel-manganese alloy; or the foam metal portion is made of titanium, and the solid metal portion is made of one of a titanium-scandium alloy, a titanium-copper alloy and a platinum-titanium-copper alloy; or the foam metal portion is made of gold, and the solid metal portion is made of a gold-silver alloy.

12. A preparation method for a current collector, the method comprising:
   a bonding step comprising stacking an alloy foil for forming a current collecting layer with a strength enhancement layer, and bonding the alloy foil and the strength enhancement layer; and
   a foam forming step comprising attaching an anti-corrosion material layer locally on the alloy foil to form an intermediate body to be subjected to foam forming, and placing the intermediate body in a corrosive solution to remove one or more elements constituting the alloy foil from a portion of the alloy foil that is not attached with the anti-corrosion material layer such that the alloy foil forms a foam metal portion, with a portion of the alloy foil that is attached with the anti-corrosion material layer forming a solid metal portion side by side with the foam metal portion on a surface of the strength enhancement layer,
   wherein the solid metal portion is provided at one or both ends of the strength enhancement layer in a width direction.

13. The preparation method according to claim 12, wherein the corrosive solution includes at least one of a dilute hydrochloric acid solution, an ammonium sulfate solution, an electrolytic solution obtained by mixing $H_2SO_4$ and $MnSO_4$, an acetic acid solution, a phosphoric acid solution, and a sulfuric acid solution.

14. The preparation method according to claim 12, wherein the alloy foil for forming the current collecting layer is bonded to the strength enhancement layer by rolling.

15. A secondary battery, comprising the current collector according to claim 1.

16. A battery module, comprising the secondary battery according to claim 15.

17. A battery pack, comprising the battery module according to claim 6.

18. A power consuming device, comprising the battery pack according to claim 17.

* * * * *